United States Patent
Jackson et al.

(10) Patent No.: US 7,330,661 B1
(45) Date of Patent: Feb. 12, 2008

(54) METHOD AND APPARATUS FOR OPTICAL COMMUNICATION BETWEEN DEVICES

(75) Inventors: Stephen S. Jackson, Chapel Hill, NC (US); Jennifer G. Rasimas, Durham, NC (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/543,223

(22) Filed: Apr. 5, 2000

(51) Int. Cl.
*H04B 10/00* (2006.01)

(52) U.S. Cl. .................. 398/118; 398/115; 398/117; 398/119; 398/124; 398/126; 398/127; 398/128; 398/130; 398/135; 398/136; 398/138; 398/154; 398/155; 398/140; 398/182; 398/183; 398/102; 398/103; 398/202; 398/208; 398/192; 370/310; 370/388; 370/396; 370/328; 370/446; 455/524; 455/525; 455/428; 455/430; 375/355; 375/365

(58) Field of Classification Search .............. 398/135, 398/128, 118, 119, 124, 129, 130, 131, 136, 398/137, 182, 202, 189, 190, 115, 117, 126, 398/127, 138, 154, 155, 158, 140, 183, 192, 398/208, 102, 103; 370/310, 388, 396, 328, 370/446; 455/428, 430, 524, 525; 375/355, 375/365

See application file for complete search history.

(56) References Cited

U.S. PATENT DOCUMENTS

| | | | | |
|---|---|---|---|---|
| 5,371,623 A | * | 12/1994 | Eastmond et al. | 398/27 |
| 5,566,022 A | * | 10/1996 | Segev | 398/107 |
| 5,864,625 A | * | 1/1999 | Rutledge | 380/31 |
| 5,986,790 A | * | 11/1999 | Ota et al. | 398/1 |
| 6,348,986 B1 | * | 2/2002 | Doucet et al. | 398/128 |
| 6,424,442 B1 | * | 7/2002 | Gfeller et al. | 398/135 |
| 6,507,425 B1 | * | 1/2003 | Dewberry et al. | 713/500 |
| 6,509,991 B1 | * | 1/2003 | Shibuya | 398/208 |
| 6,650,451 B1 | * | 11/2003 | Byers et al. | 398/129 |

OTHER PUBLICATIONS

"Signal Detection and Classification of Targets Using Multiple Aspect Angles," Jennifer G. Rasimas, Department of Electrical and Computer Engineering, Duke University, 1998.

"Bayesian Signal Detection of Multiple Aspect Targets with an Uncertain Look Angle," Rasimas et al., Department of Electrical and Computer Engineering, Duke University, Apr. 1999.

* cited by examiner

*Primary Examiner*—Hanh Phan
(74) *Attorney, Agent, or Firm*—McGuinness & Manaras LLP

(57) ABSTRACT

A method and apparatus for processing a data signal for transmission to a remote device transmits at least two synchronized copies of the data signal, in optical form, in different directions. To that end, the data signal first is synchronized to a clock signal to produce a composite signal. The composite signal then is converted to an optical signal, which is referred to as an "outgoing signal." A plurality of copies of the outgoing signal then are transmitted. At least two copies of the outgoing signal are transmitted in different directions.

50 Claims, 6 Drawing Sheets

US 7,330,661 B1

METHOD AND APPARATUS FOR OPTICAL COMMUNICATION BETWEEN DEVICES

FIELD OF THE INVENTION

The invention generally relates to data transmission between two or more devices and, more particularly, the invention relates to optical data transmission between two or more computer devices.

BACKGROUND OF THE INVENTION

Computer networks commonly include two or more computer devices that are mechanically connected by some physical medium. For example, the physical medium can be a hub, a connection wire, or intervening computer device that couples printers, personal computers, servers, and network appliances. One widely used type of network, known as a local area network ("LAN"), often utilizes such physical media for connecting computer devices that are in a relatively close geographical proximity.

Due to the increased development and use of mobile computer devices, a need has developed to easily and rapidly couple computer devices with a network. The art has responded to this need by providing wireless networks that permit wireless access to a network by computer devices. A properly enabled computer device thus can communicate with such a network without a physical connection to that network. To that end, many computer devices have been designed to include a radio wave transceiver (also called an "RF transceiver") that is configured to interface with other similarly configured radio wave transceivers on other computer devices. Accordingly, such computer devices can communicate with other similarly enabled devices to join and/or form a network.

Use of RF transceivers for communicating with another computer device, however, presents a number of problems. Specifically, the known radio frequency ("RF") spectrum has a limited bandwidth, consequently limiting the total number of network devices that can be in a single network, and/or reducing the speed and quality of network transmissions. In addition, RF transmissions can be received by unintended computer devices, thus compromising the confidentiality and security of network transmissions. To compensate for such security problems, RF network transmissions have been encrypted by known encryption protocols. Of course, since encrypted RF transmissions necessarily require more bandwidth than those that are not encrypted, such solution undesirably further exacerbate the limited bandwidth problems of such networks.

SUMMARY OF THE INVENTION

In accordance with one aspect of the invention, a method and apparatus for processing a data signal for transmission to a remote device transmits at least two synchronized copies of the data signal, in optical form, in different directions. To that end, the data signal first is synchronized to a clock signal to produce a composite signal. The composite signal then is converted to an optical signal, which is referred to as an "outgoing signal." A plurality of copies of the outgoing signal then are transmitted. At least two copies of the outgoing signal are transmitted in different directions.

In some embodiments, the outgoing signal is in the infrared spectrum and/or amplified prior to transmission. In addition, the composite signal may be encrypted prior to converting it to the outgoing signal. Although an encrypted signal requires more bandwidth, such additional bandwidth generally is available in the optical spectra. The clock signal of the composite signal may be synchronized with a timing signal from another incoming optical signal. Among other things, the data signal may include video data or audio data. The plurality of copies of the outgoing signal generally are transmitted through an air medium. Moreover, the different directions in which the at least two copies are transmitted may overlap.

In accordance with another aspect of the invention, a method and apparatus for processing data received from a remote device first receives a plurality of copies of a single optical signal. Such optical signal is the optical form of a first signal that is a data signal. The plurality of copies of the optical signal then are converted into a plurality of second data signals. Each second data signal has data from one of the copies of the optical signal. The plurality of second data signals then are stored in memory so that they can be utilized to reconstruct the first data signal. More particularly, the first data signal is reconstructed from at least one of the plurality of second data signals in memory.

In some embodiments, the first data signal is reconstructed by first designating one of the plurality of copies of the optical signal as the primary optical signal. Accordingly, the second data signal in memory that corresponds to the primary optical signal is designated as the primary second data signal. In such embodiment, the primary second data signal is retrieved from memory and utilized to reconstruct the first data signal. If the primary second data signal is incomplete (i.e., it is missing some data), then additional data of the first data signal is retrieved from at least one of the other second data signals in memory.

Preferred embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and other advantages of the invention will be appreciated more fully from the following further description thereof with reference to the accompanying drawings wherein.

DETAILED DESCRIPTION OF ILLUSTRATIVE EMBODIMENTS

Figure 1:
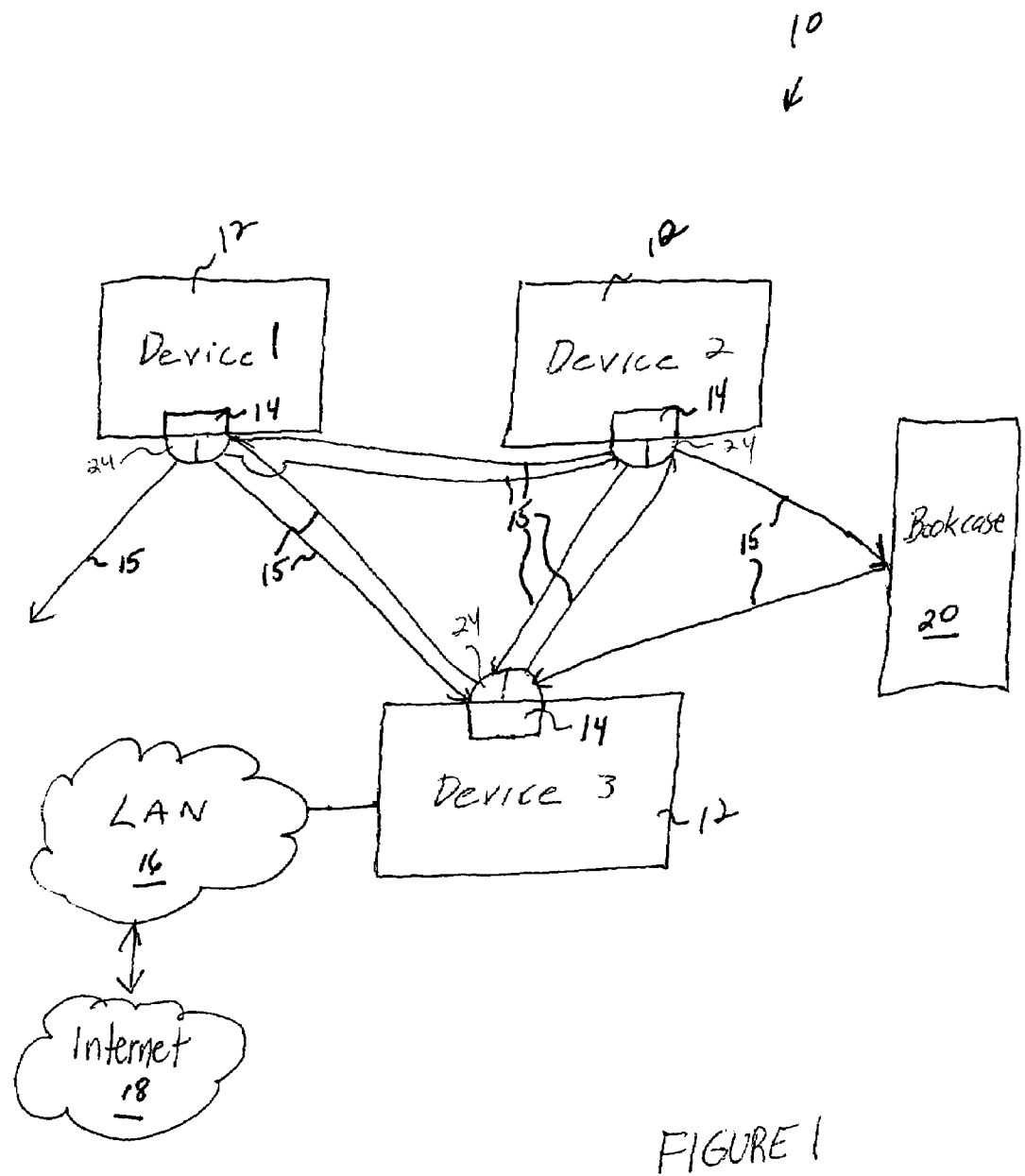
FIG. 1 schematically shows an exemplary network arrangement that utilizes illustrative embodiments of the invention.

FIG. 1 schematically shows a simplified wireless network 10 having a plurality of network devices. Each of the network devices communicate with other network devices by transmitting optical signals in a prescribed format. In illustrative embodiments, the optical signals are in the infrared spectrum. It nevertheless should be noted, however, that although infrared signals are discussed, principles of various embodiments can be applied to optical signals in other light spectra. Accordingly, discussion of infrared signals should not be construed to limit various embodiments of the invention.

The network 10 shown in FIG. 1 includes three computer devices, generally identified as device 12, but specifically identified in the drawing as device 1, device 2, and device 3, respectively. The devices 12 may be any network or computer device, such as a server, personal computer, network appliance, printer, server, or other device. The devices 12 thus may be any network device that is capable of being coupled with the network 10. Each device 12 includes the logic for joining the network 10 and maintaining a network connection, as well as a physical interface 14 for communicating with the other network devices 12. As shown and discussed in greater detail with reference to FIG. 2, the physical interface 14 for communicating with the other devices 12 is an optical modem engine (referred to herein as engine 14A and show in detail in FIG. 2). Among other things, the illustrative optical modem engines 14A shown in FIG. 2 utilize optical transponders 28 (also shown in FIG. 2) for transmitting and receiving optical signals.

Returning to FIG. 1, device 3 as shown is coupled with a conventional local area network ("LAN 16") that is in communication with the Internet 18. The connection between device 3 and the LAN 16 may be via any medium, such as the described optical medium, or via a conventional physical connection (e.g., through a wire). Device 1 and device 2 thus may access the Internet 18, or other networks, via device 3. In accordance with preferred embodiments, the devices 12 are shown as communicating through light beams (also referred to as "optical signals"). As known by those skilled in the art, a light beam is considered to be emitted from one of the devices 12 in a cone that diverges as it travels from its source. In addition, each light beam includes a plurality of light rays 15. To simplify the drawings, the figures were drawn to show rays 15 only. It should be understood, however, that each arrow in the drawings schematically represents one of a plurality of rays 15 in its respective conical light beam.

The light beams/rays 15 shown in FIG. 1 exemplify a plurality of paths that may be utilized by the devices 12 to communicate. For example, device 2 transmits data to device 3 by transmitting a ray 15 that bounces off a bookcase 20 prior to being received by device 3. Conversely, device 3 transmits data to device 2 by a direct ray 15 from its transponder 28 to the transponder 28 of device 2. As discussed in greater detail below with reference to FIGS. 2-6, each device 12 preferably optically transmits multiple copies of a single data signal in a plurality of different directions.

In preferred embodiments, the three devices 12 are located within a physically confined area, such as a single room with a limited amount of potentially interfering infrared light sources. Accordingly, only devices 12 that are visible to the three devices 12 can intercept their optical transmissions. Stated another way, only devices that can detect the infrared transmissions of the devices 12 can intercept their optical transmissions. This ensures the security and confidentiality of the data transmitted through the network 10. Moreover, it facilitates a controlled bandwidth allocation process (discussed below) that reduces the number of potentially interfering outside devices that could be utilizing the same frequency.

By way of example, a second network may be implemented in an optically isolated, adjoining room to that of the shown network 10. In fact, the second network can be identical to that of the shown network 10 and utilize the exact same frequencies in the infrared spectrum as those utilized by the devices 12 in the shown network 10. Since the optical transmissions cannot penetrate the walls of the respective rooms of the two networks, there should be no interference between the two networks, thus providing more bandwidth to both networks. In addition, since each of the two networks are not capable of receiving the transmissions of the other network, then their transmissions should remain secure.

Figure 2:
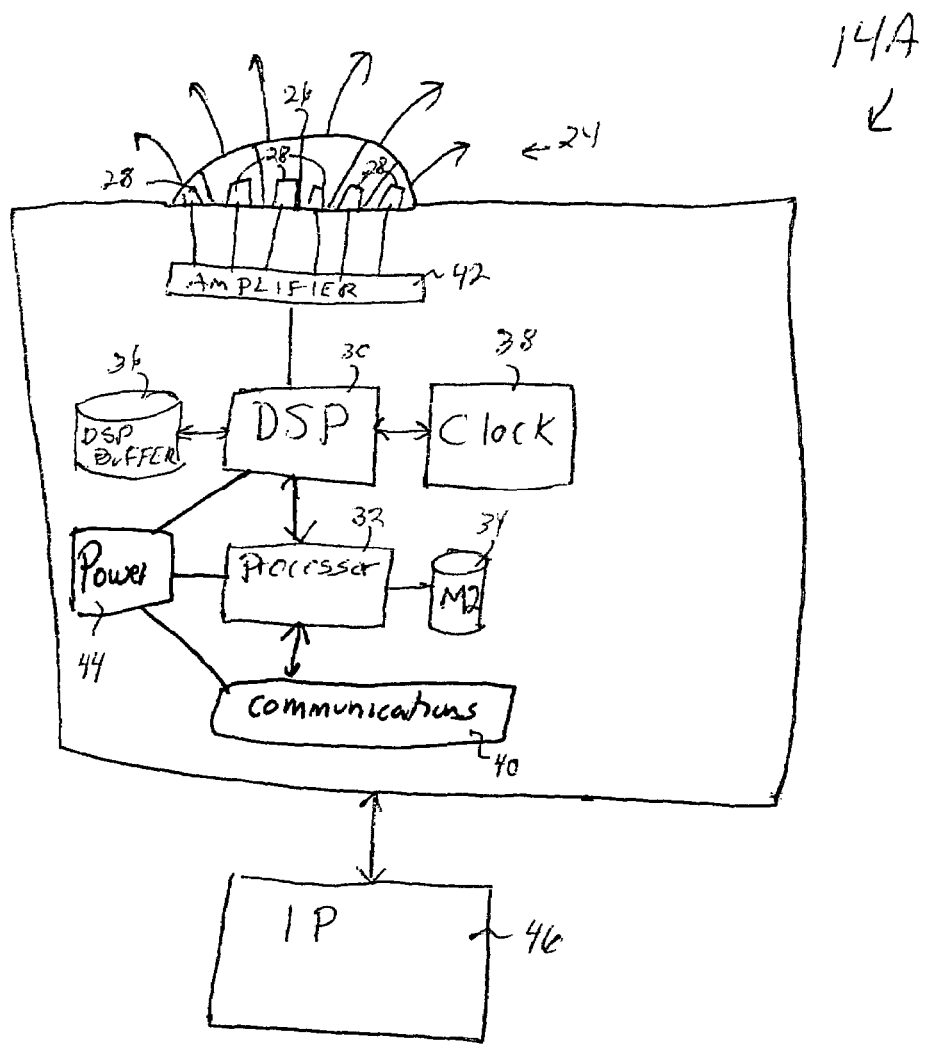
FIG. 2 schematically shows an exemplary optical modem engine configured in accordance with illustrative embodiments of the invention.

FIG. 2 schematically shows an exemplary optical modem engine 14A configured in accordance with illustrative embodiments of the invention. As noted above, the engine 14A is configured to both optically transmit a plurality of copies of a single data signal, and receive a plurality of copies of another single data signal. The plurality of transmitted copies preferably are transmitted in a diffused manner in different directions, and synchronized to a single clock signal. It should be noted that the term "optical modem" may be used herein may refer to the hardware alone (i.e., the engine 14A), or both the hardware and software utilized to effectuate the desired function.

The engine 14A includes a signal interface 24 for transmitting and receiving optical signals, and controlling hardware for controlling operation of the signal interface 24. In preferred embodiments, the signal interface 24 includes a doming material ("dome 26") containing a plurality of transponders 28 that are controlled by the controlling hardware. The dome 26 may act as a lens in accord with well known Fresnel lensing techniques. Although many transponders 28 can be utilized, it is expected that between two and six transponders 28 should provide satisfactory results. As discussed herein, each transponder 28 is configured to transmit its optical signal in a different physical direction than that of the other transponders 28. Although transmitted in different directions, however, optical signals from the various transponders 28 can overlap with other optical signals from peer transponders 28 transmitting the same optical signal. In a manner similar to its transmission of optical signals, each transponder 28 also can receive optical signals from a specified range of angles. Accordingly, one transponder 28 may be capable of receiving optical signals from one device 12, while another corresponding peer transponder 28 on the same device 12 cannot receive such optical signals.

Any modulation technique, such as pulse width modulation, may be utilized by the transponders 28 for modulating their respective signals. In alternative embodiments, optical signals may be modulated by means of other known techniques, such as amplitude modulation and frequency modulation. In preferred embodiments, the transponders 28 are network quality optical transponders 28.

Unlike the interface 24 shown in FIG. 2, various embodiments include distributed transponders 28 with accompanying lenses/domes 26. For example, instead of having all the transponders 28 mechanically secured to the engine 14A, the engine 14A may have one or more additional transponders 28, within a lens/dome 26, at a remote location. The additional transponders 28 may be connected to the modem through a wire, or through a wireless connection.

The controlling hardware includes one or more digital signal processors ("DSPs 30") that are controlled by a microprocessor 32. The DSPs 30 can perform any function required by the engine 14A, such as signal correction and encryption (discussed below). The microprocessor 32 includes memory 32 and other hardware (not shown) for executing its processes. In a similar manner, the DSPs 30 include local memory ("DSP memory 36") for storing data signals received within the incoming optical signals. The DSP memory 36, which preferably is an electronic memory type (e.g., random access memory), may be external to the DSPs 30, or a part of the DSPs 30 themselves. The DSPs 30 also are coupled with a clock 38 that is utilized to time outgoing optical signals. Details of the signal timing are discussed below with reference to FIG. 6. The controlling hardware also includes a communications card 40 for providing serial I/O communications layer functions. For example, the communications card 40 may be an Ethernet card that is controlled by the microprocessor 32.

Each of the transponders 28 preferably includes power amplification for appropriate powering purposes. Accordingly, each transponder 28 is coupled with an amplifier 42 for amplifying the outgoing optical signals. The amplifier 42, microprocessor 32, and communications card 40 preferably are powered by a single power module 44. In illustrative embodiments, the power module 44 is a hybrid power source that provides both switching power and linear power.

The engine 14A may be coupled with a network layer module 46 that facilitates communication with a larger network, such as the Internet 18. Accordingly, in such case, the network layer module 46 may be an Internet Protocol engine (also referred to as the "IP layer"), which implements the Internet Protocol.

Accordingly, in summary, data generated by the device 12 is transformed by the engine 14A for appropriate transmission to a remote device 12 (i.e., another device 12 that is not physically connected to the transmitting device 12). In addition, data received by the engine 14A is converted into a data signal for use by the device 12. Details of the data transmission and reception processes are discussed below.

Figure 3:
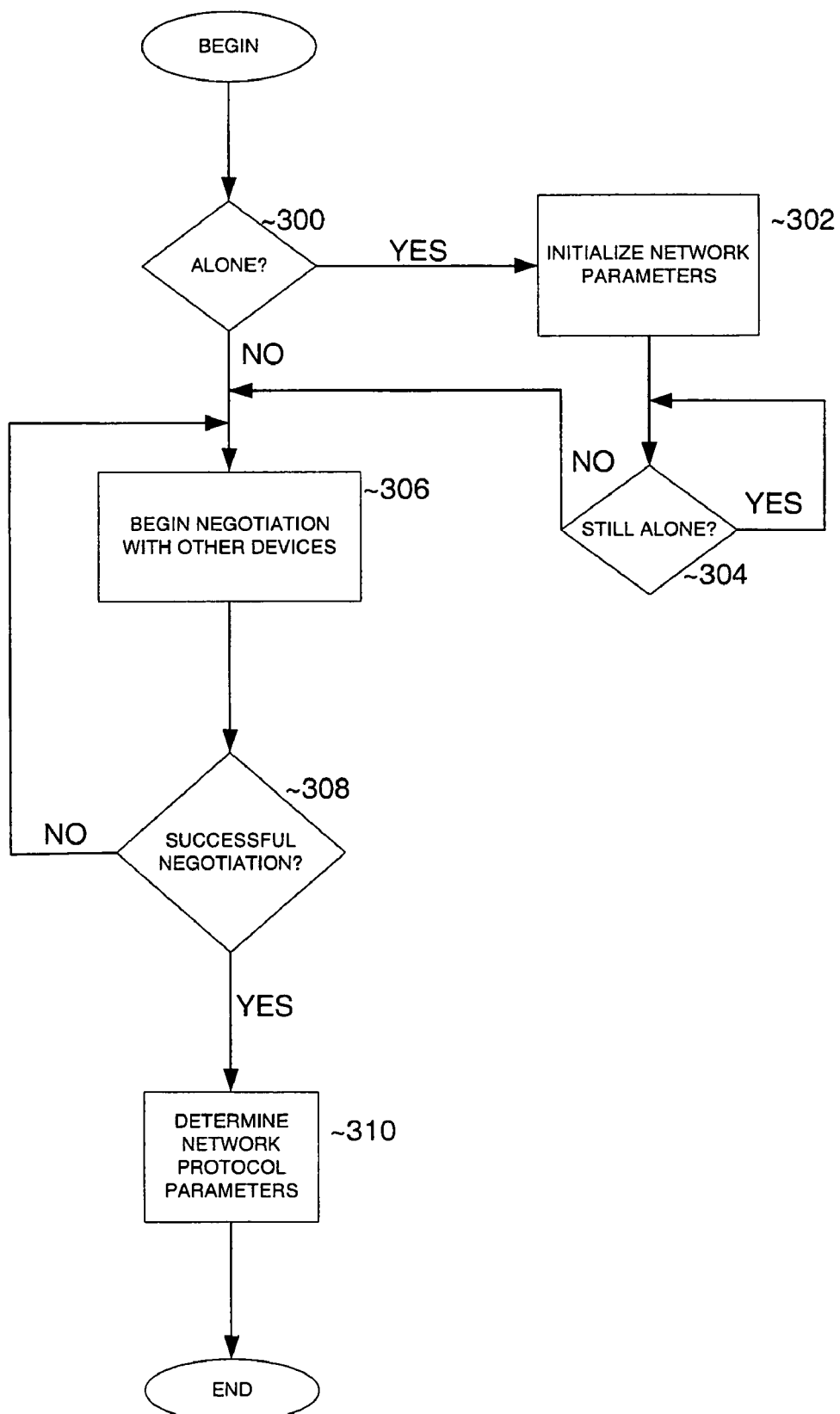
FIG. 3 shows an illustrative initialization process utilized by a computer device implementing illustrative embodiments of the invention.

FIG. 3 shows an illustrative initialization process utilized by a computer device 12 for either joining an existing network, or forming a new network. The initialization process is utilized to set the network parameters that are to be utilized for maintaining the network 10. The process begins at step 300, in which the computer device 12 determines if there are any other local computer devices 12 that utilize optical messages, in accordance with illustrative embodiments, for forming a network 10. Stated another way, the device 12 determines if it is alone in a given geographical area (e.g., a single room). To that end, the device 12 checks its transponders 28 to determine if they detect any similarly configured optical signals from other devices 12.

If the device 12 is alone, then such device 12 is designated as the "master" device 12. Each of the other devices 12 that subsequently join the network 10 thus may be "slave" devices 12 that operate in accordance with the instructions of the master device 12. Accordingly, although the illustrative network 10 generally is considered to be a peer-to-peer network 10, one of the devices 12 manages operation of the network 10. Although a peer-to-peer network 10 is shown, however, principles of the invention can be applied to other network topologies, such as those having a client-server topology.

Once it is determined that the device 12 is alone, the process continues to step 302, in which the master device 12 initializes various network parameters. Among others, the network parameters may include: 1) the DSP buffer size (in DSP memory 36) that is to be utilized by each device 12 that is a member of the network 10, 2) the maximum bandwidth to be used by the network 10, 3) the clock signal to be utilized by all devices 12 in the network 10 when transmitting their respective optical signal, and 4) the encryption method, if any, to be used by the devices 12 in the network 10. Each of these parameters are discussed immediately below.

The DSP buffer size is an amount of the DSP memory 36 that is allocated to each transponder 28 of each device 12. Specifically, each transponder 28 in each device 12 is assigned a single first-in first-out buffer ("FIFO") in the DSP memory 36 for storing data received from other network devices 12. Accordingly, the FIFO size is set to a size that sets the bounds of the network transmissions. Stated another way, the size of the FIFO is the metic upon which the bounds of data transmissions (known in the art as "block syncs") are set. The time between the block syncs thus is the size of the FIFO.

To that end, the master device 12 transmits a test optical message within the area containing the network 10, and then waits until it receives a reflection of such message. The device 12 can detect its signal by reading header data in the optical signal after it is converted to a data signal. The header data thus includes information identifying the transmitting device 12. The time between transmission and receipt of the respective messages is then determined, and an amount of data that can be stored in the DSP memory 36 in such time is calculated. The buffer size then is set to be the calculated amount of data that can be stored in memory.

The second of the noted parameters, the maximum bandwidth, is determined with relation to other infrared emitting objects in the immediate vicinity. In particular, the device 12 determines if any other objects (e.g., an operating heater, or a large window that provides bright sun) that may utilize some of the available bandwidth are present in the room. If a reasonable amount is available (i.e., enough to maintain a network 10), then the device 12 utilizes as much bandwidth as is available. Such bandwidths can range from about 0.5 megabits per second to about 32 megabits per second. By way of example, if an operating heater is emitting infrared light that utilizes forth-five percent of the total available bandwidth in a room, then the device 12 will attempt to use as much of the available fifty-five percent of the total bandwidth that remains.

In some embodiments, a set percentage of the determined available bandwidth is reserved to compensate for possible interference from unanticipated infrared sources, such as a heater that was not operating when the parameters first were calculated, but subsequently begins operating. The bandwidth used by the devices 12 in the network 10 is expected to be shared among the various devices 12 in a round robin manner.

The clock signal to be utilized in the network 10 (i.e., the third of the noted parameters) may be arbitrarily selected by the master device 12. In illustrative embodiments, the clock signal is derived from the clock 38 shown in FIG. 2. Among other uses, the clock signal is utilized to permit the various devices 12 in the network 10 to synchronously communicate. Specifically, as discussed herein, data signals generated by each device 12 in the network 10 for transmission to other network devices 12 (referred to herein as the "underlying data signal") each are converted into an optical signal for communication within the network 10. In illustrative embodiments, the optical signals are each modulated with a synchronous, orthogonally related frequency division multiplexed carrier array. Prior to being converted into an optical signal, however, each underlying data signal is synchronized with a clock signal to form a composite signal. In some embodiments, the clock signal is embedded in the data signal. In other embodiments, the clock signal merely is synchronized with the data signal. In both embodiments, however, the clock signal and data signal are considered to form a composite signal.

As discussed in greater detail below with reference to FIGS. 4 and 5, a receiving device 12 converts a received optical composite signal into the composite data signal (i.e., the data signal form of the composite signal before it was converted into an optical signal by the transmitting device 12). Once converted, the receiving device 12 then utilizes the timing signal to reconstruct the underlying data signal. It should be noted that in addition to having the underlying data signal and the timing data from the clock signal, the composite signal also has a header having various other data, such as data identifying the transmitting and receiving devices 12.

The fourth listed network parameter is the encryption method that is to be utilized by the devices 12 in the network 10. In many embodiments, encryption is not necessary since only those devices 12 in the local proximity can detect network communications. There nevertheless may be times, however, when encryption is necessary. For example, if a plurality of networks are formed in a single local area, then use of secure transmissions becomes more paramount. Accordingly, various embodiments can encrypt the underlying data signal, or the entire composite signal. In illustrative embodiments, the well known Digital Encryption Standard 3 ("DES3") is utilized. Of course, any known optical or data encryption method may be utilized.

During or after the network parameters in step 302 are initialized by the master device 12, the process continues to step 304, in which it is determined if the master device 12 is still alone. Such device 12 pauses in this state until it determines that it is not alone. Accordingly, when the device 12 determines at step 304 that it is not alone, then the process continues to step 306, in which the master device 12 begins negotiating with the other device 12 that just requested membership to the network 10.

When discussing step 306 from step 304, the process of FIG. 3 is executed from the point of view of the master device 12. Conversely, returning to step 300, if the device 12 making the initial query determines that it is not alone, then the process also continues to step 306. Accordingly, when discussing step 306 from step 300, the process is executed from the point of view of the slave device 12.

Repeating the above, the negotiation step 306 entails various "handshake" processes utilized by the master and slave devices 12 to permit the slave device 12 to join the network 10. More particularly, the slave device 12 ascertains the various network parameters from the master device 12, and requests a set amount of the available bandwidth. For example, the master device 12 will transmit an unencrypted parameter message to the slave device 12 identifying the encryption method (if any) and other encryption data, the buffer size, timing signal parametric data, total available bandwidth, and other parametric data. In some embodiments, the parameter message is encrypted by a known method that permits the slave device 12 to easily decrypt such message.

As noted above, in addition to requesting the network parametric information, the slave device 12 requests a specified amount of the total bandwidth of the network 10. This amount can be specified with quality of service (QoS) considerations to ensure a minimum bandwidth for the slave device 12. For example, a voice over IP network appliance (also known as an Internet telephone) can request a preselected minimum bandwidth to ensure that its transmissions are transmitted. In addition, a slave device 12 can request priority for its data transmissions in the network to ensure that its data is transmitted before data of other devices 12. Continuing with the voice over IP network appliance example, this can increase the likelihood that voice data will more readily stream to the intended destination.

After the various priority, QoS, and bandwidth allocation, among other requests, are requested by the slave device 12, then the master device 12 must determine if such requests can be permitted. If such requests cannot be permitted (e.g., not enough available network resources), then the process repeats step 306 to continue negotiation. The slave device 12 then may reduce its various requested requirements. In some embodiments, the master device 12 may suggest modifications to the resource requests that would be permitted.

Conversely, if at step 308 the negotiation was successful, then the process continues to step 310, in which network protocol parameters are determined. In illustrative embodiments, the network protocols facilitate conventional communications layer (i.e., network layer) transmissions, such as IP transmissions. Accordingly, this permits network layer communications paths to be opened, thus ending the process.

Figure 4:
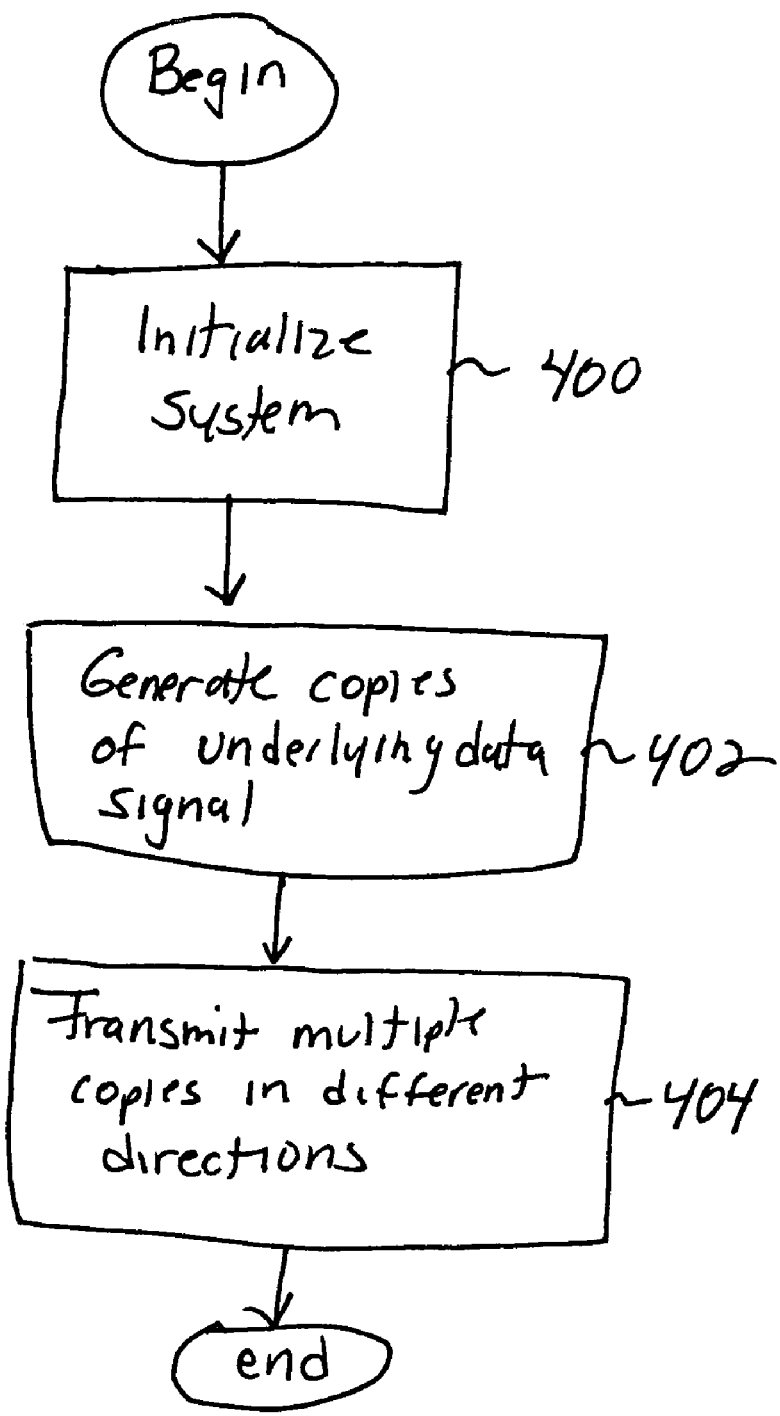
FIG. 4 shows a process of transmitting optical signals in accordance with illustrative embodiments of the invention.

FIG. 4 shows an illustrative process utilized by a computer device 12 to transmit data within the optical network 10 shown in FIG. 1. The process begins at step 400, in which the network 10 and/or the device 12 are initialized in accordance with the process discussed with reference to FIG. 3. Of course, if the network 10 and device 12 already are initialized, this step may be omitted. Once the network 10 is initialized, then the process continues to step 402, in which multiple optical copies of the signal to be transmitted to the remote receiver device 12 are generated. To that end, as discussed below, the composite signal (i.e., the signal having the timing data, underlying data signal, and header data) is converted into a plurality of identical optical signals by the DSPs 30 for transmission by the transponders 28. Once converted, the process continues to step 404, in which each copy of the composite signal is transmitted by one of the transponders 28 in a different direction than that utilized by the other transponders 28. Of course, the directions can overlap. In some embodiments, only two transponders 28 transmit in different directions, while the other transponders 28 transmit in the same direction. Accordingly, this process synchronously transmits a single data signal in a diffused optical pattern by means of multiple identical optical signals.

Figure 5:
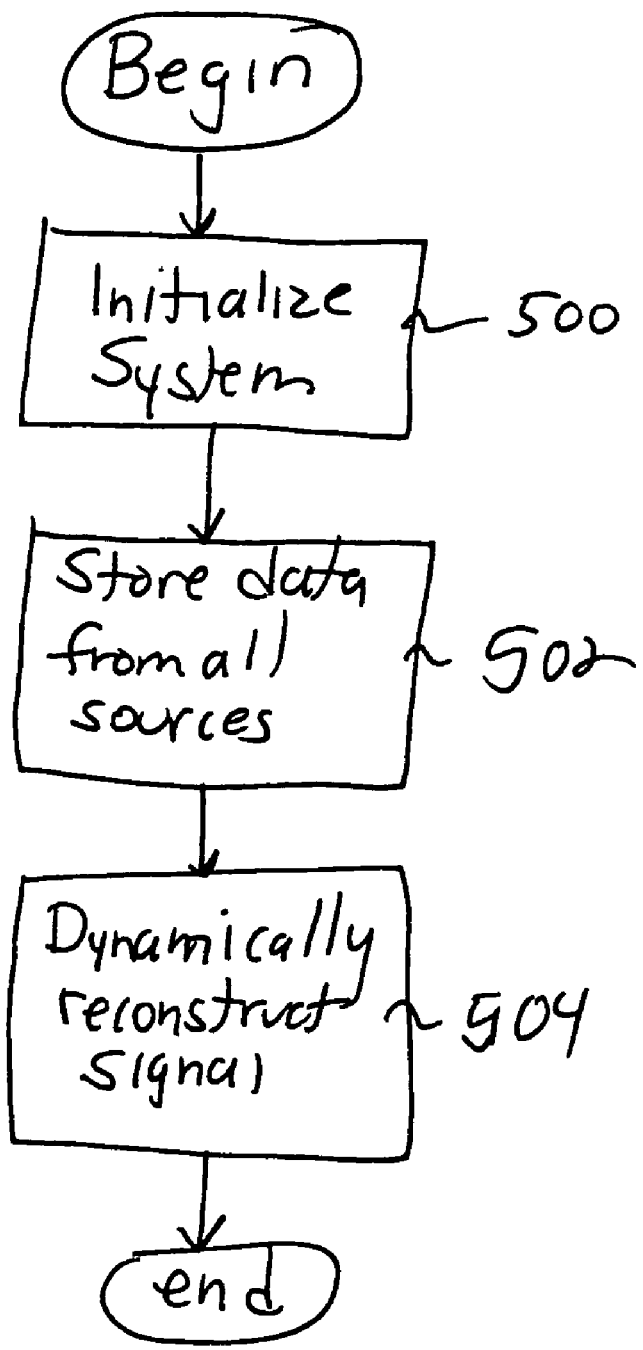
FIG. 5 shows a process utilized by a computer device for receiving a plurality of received optical signals in accordance with illustrative embodiments of the invention.

FIG. 5 shows an illustrative process utilized by a computer device 12 to receive a plurality of optical signals transmitted in the manner described in FIG. 4. As noted in the discussion of that process (FIG. 4), a plurality of identical optical signals are transmitted to the receiving device 12 in different directions. As shown in FIG. 1, due to the different paths and physical orientation of the devices 12 themselves, the various optical signals may arrive at the receiving device 12 at different times. In fact, some of the plurality of optical signals may not be received by the receiving device 12. The process of FIG. 5 is discussed in this context.

The process begins at step 500, in which the network 10 and/or the device 12 are initialized. In a manner similar to the process shown in FIG. 4, if the network 10 and device 12 already are initialized, then this step may be omitted. The process then continues to step 502, in which data from each received optical signal is stored in the DSP memory 36. To that end, the receiving device 12 first recognizes the incoming signals as being transmitted from a device 12 in the network 10. Accordingly, each such received optical signal is converted to the composite signal (discussed above), which is an electronic data signal that is capable of being stored in an electronic data storage mechanism (i.e., the DSP memory 36). Redundant copies of the composite signal thus ideally are stored in the DSP memory 36.

In actual use, however, it is anticipated that the total number of copies of data actually stored in memory may vary depending upon the actual receipt of the various copies of the optical signal. For example, in a device 12 having six transponders 28, any number of copies from no copies to six copies may be received by the receiving device 12. In fact, some of the received copies may be attenuated due to their bouncing from various objects in a room, such as the bookcase 20 in FIG. 1, or the walls of the room containing the network 10. As shown below, these attenuated, delayed optical signals, which are known in the art as "multipath signals," also are utilized to reconstruct the underlying data signal.

Figure 6:
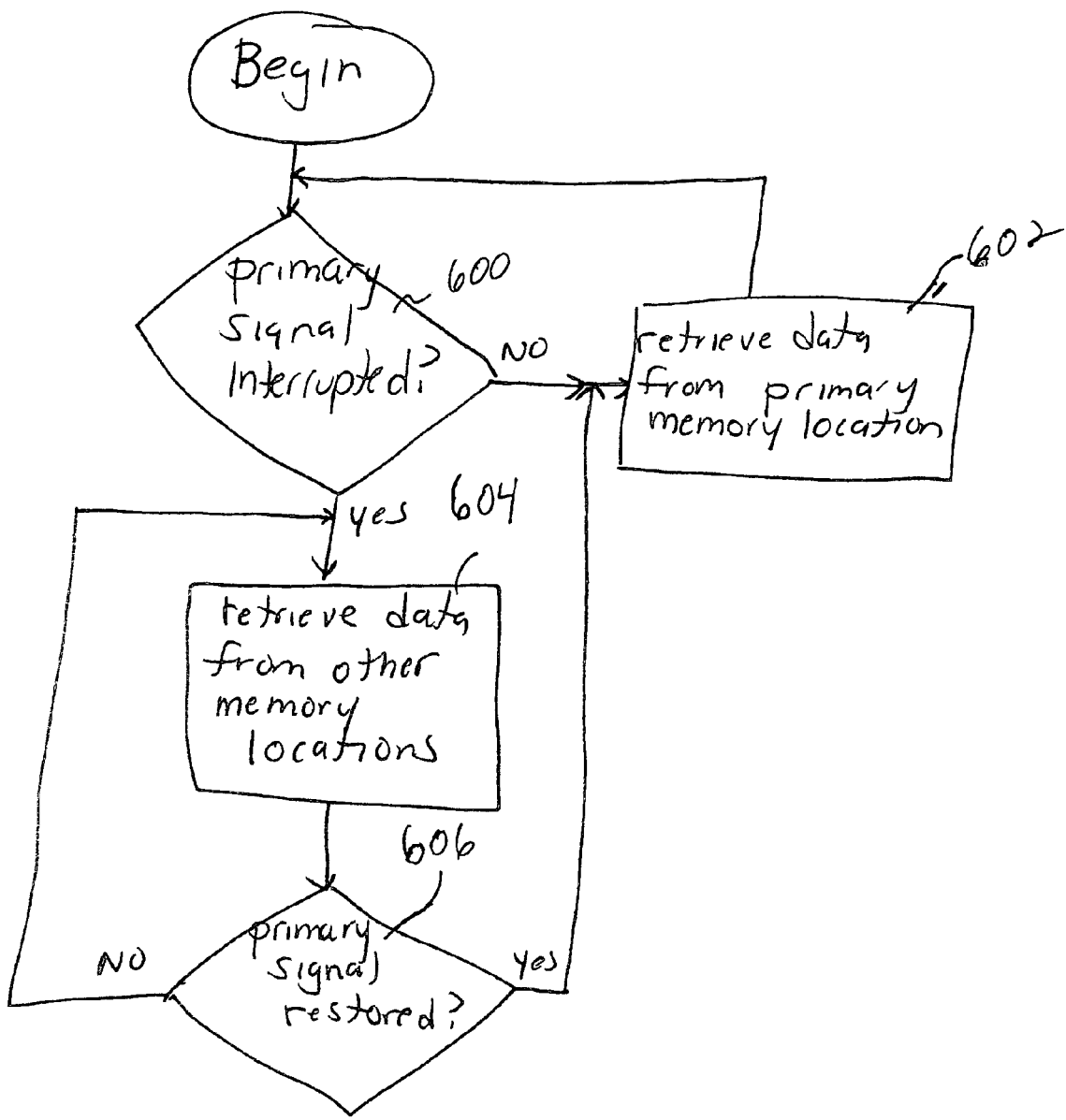
FIG. 6 shows an illustrative process of reconstructing a data signal from a plurality of received optical signals.

The process then continues to step 504, in which the underlying data signal is dynamically reconstructed from the data stored in the DSP memory 36. This process is shown in FIG. 6. Specifically, the underlying data signal reconstruction process begins at step 600, in which it is determined if an optical signal from the transmitting device 12 (identified as the "primary signal") is interrupted. More particularly, the receiving device 12 designates one of the one or more optical signals received from the transmitting device 12 as the "primary signal." In illustrative embodiments, the primary signal is the one optical signal having the strongest intensity. Undesirably, as suggested in step 600, the primary signal may be interrupted. For example, the primary signal may be interrupted if somebody walks between its transponder 28 and the receiving device 12, or if its transponder 28 fails.

If the primary signal is not interrupted, then the process continues to step 602, in which the underlying data signal is retrieved from the DSP memory location that has the underlying data signal transmitted by primary signal. In particular, the data in the DSP memory 36 representing the primary optical signal is utilized to reconstruct the underlying data signal from the transmitting device 12. This repeats until the primary signal is interrupted.

If the primary signal is interrupted, then the process continues to step 604, in which data from the underlying data signal is reconstructed from the other memory locations in the DSP memory 36. In particular, for each time along the timing signal that data is missing on the primary signal (i.e., data from the underlying data signal is missing), such data can be retrieved from the other, redundant signals in memory. For example, such data can be parsed from the less strong signals and multipath signals (i.e., from the redundant signals). Use of the redundant data in the DSP memory 36 is continued until the primary signal is restored (step 606).

In some embodiments, the network 10 may require reconfiguration during periodic intervals. For example, the master device 12 may malfunction. In such case, a new master device 12 is selected. Any arbitration process for selecting a new master device 12 may be utilized. It also should be noted that various embodiments execute both the receiving and transmitting (i.e., transponding) processes substantially simultaneously.

Implementations of the various embodiments of the invention can be quite broad. For example, airplanes can be equipped with such technology to provide Internet access to passengers. Each seat can have an accompanying infrared transponder that illuminates a single seat in a cone of light. This implementation significantly improves upon current RF implementations, which can interfere with navigational and radar equipment in an airplane.

Some embodiments of the invention may be implemented in any conventional computer programming language. For example, preferred embodiments may be implemented in a procedural programming language (e.g., C) or an object oriented programming language (e.g., C++ or JAVA). Alternative embodiments of the invention may be implemented as preprogrammed hardware elements (e.g., application specific integrated circuits and digital signal processors, as discussed), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of processing a data signal for transmission to a remote device, the method comprising:

synchronizing the data signal with a clock signal to produce a composite signal;

converting the composite signal to an outgoing signal, the outgoing signal being a wireless optical signal;

transmitting a plurality of copies of the outgoing signal, at least two copies of the outgoing signal being transmitted in different directions, a first copy being transmitted by a first directional transmitter in a first cone of focus and a second copy being transmitted by a second directional transmitter in a second cone of focus, the first and second cones of focus being non-overlapping, the first and second transmitters having non-identical transmission directions; and receiving, by the remote device, the first and second copies of the outgoing signal at different times.

2. The method as defined by claim 1 wherein the outgoing signal is in the infrared spectrum.

3. The method as defined by claim 1 further comprising: amplifying the outgoing signal.

4. The method as defined by claim 1 further comprising: encrypting the composite signal prior to converting it to the outgoing signal.

5. The method as defined by claim 1 further comprising: receiving an incoming signal, the incoming signal being an optical signal and having a specified timing signal, the clock signal of the composite signal being synchronized with the specified timing signal.

6. The method as defined by claim 1 wherein the data signal includes at least one of video data and audio data.

7. The method as defined by claim 1 wherein the plurality of copies of the outgoing signal are transmitted through the air.

8. The method as defined by claim 1 where the different directions overlap.

9. A network device for transmitting a data signal to a remote device, the network device comprising:

a synchronization module for synchronizing the data signal with a clock signal to produce a composite signal;

a signal converter operatively coupled with the synchronization module, the signal converter converting the composite signal to an outgoing signal, the outgoing signal being a wireless optical signal; and an optical transmitter operatively coupled with the signal converter, the optical transmitter transmitting a plurality of copies of the outgoing signal, at least two copies of the outgoing signal being transmitted in different directions, the optical transmitter including first and second directional transmitters operable to transmit in first and second cones of focus having non-identical transmission directions, the first and second cones of focus being non-overlapping, and being operative to transmit a first copy by the first directional transmitter and a second copy by the second directional transmitter, the first and second copies of the outgoing signal both being received by the remote device.

10. The network device as defined by claim 9 wherein the outgoing signal is in the infrared spectrum.

11. The network device as defined by claim 9 further comprising:

an amplifier operatively coupled with the signal converter, the amplifier amplifying the outgoing signal.

12. The network device as defined by claim 9 further comprising:

an encryption module for encrypting the composite signal prior to converting it to the outgoing signal.

13. The network device as defined by claim 9 further comprising:

a receiver for receiving an incoming signal, the incoming signal being an optical signal and having a specified timing signal, the clock signal of the composite signal being synchronized with the specified timing signal.

14. The network device as defined by claim 9 wherein the data signal includes at least one of video data and audio data.

15. The network device as defined by claim 9 wherein the plurality of copies of the outgoing signal are transmitted through the air.

16. The network device as defined by claim 9 where the different directions overlap.

17. A computer program product for use on a computer system for processing a data signal for transmission to a remote device, the computer program product comprising a computer usable medium having computer readable program code thereon, the computer readable program code, the computer program product comprising:

program code for synchronizing the data signal with a clock signal to produce a composite signal;

program code for converting the composite signal to an outgoing signal, the outgoing signal being a wireless optical signal; and program code for transmitting a plurality of copies of the outgoing signal, at least two copies of the outgoing signal being transmitted in first and second cones of focus in different directions, the first and second cones of focus being non-overlapping, a first copy being transmitted by a first directional transmitter and a second copy being transmitted by a second directional transmitter, the first and second transmitters having non-identical transmission directions, the first and second copies of the outgoing signal both being received by the remote device.

18. The computer program product as defined by claim 17 wherein the outgoing signal is in the infrared spectrum.

19. The computer program product as defined by claim 17 further comprising:

program code for amplifying the outgoing signal.

20. The computer program product as defined by claim 17 further comprising:

program code for encrypting the composite signal prior to converting it to the outgoing signal.

21. The computer program product as defined by claim 17 further comprising:

program code for receiving an incoming signal, the incoming signal being an optical signal and having a specified timing signal, the clock signal of the composite signal being synchronized with the specified timing signal.

22. The computer program product as defined by claim 17 wherein the data signal includes at least one of video data and audio data.

23. The computer program product as defined by claim 17 wherein the plurality of copies of the outgoing signal are transmitted through the air.

24. The computer program product as defined by claim 17 where the different directions overlap.

25. A method of processing data received from a remote device, the method comprising:

receiving, at different points in time, a plurality of copies of a single optical signal, the copies created by the remote device, a first copy being transmitted by a first directional transmitter and a second copy being transmitted by a second directional transmitter, the first and second transmitters having non-identical transmission directions, the optical signal being a wireless optical form of a first data signal;

converting the plurality of copies of the optical signal into a plurality of second data signals, each second data signal having data from one of the copies of the optical signal;

storing the plurality of second data signals in memory; and reconstructing the first data signal from the plurality of second data signals in memory.

26. The method as defined by claim 25 wherein the act of reconstructing comprises:
designating one of the plurality of copies of the optical signal as a primary optical signal, the second data signal in memory that represents the primary optical signal being a primary second data signal;
retrieving the primary second data signal; and
if the primary second data signal is incomplete, then retrieving additional data of the first data signal from at least one of the other second data signals in memory.

27. The method as defined by claim 25 wherein the optical signal is an infrared signal.

28. The method as defined by claim 25 wherein the plurality of copies of the optical signal are received through the air.

29. The method as defined by claim 25 wherein the first data signal includes at least one of audio data and video data.

30. The method as defined by claim 25 further comprising:
generating a first outgoing signal, the first outgoing signal being a data signal;
synchronizing the first outgoing signal with a timing signal to produce a composite signal;
converting the composite signal into a second outgoing signal that is an optical signal;
transmitting a plurality of copies of the second outgoing signal to the remote device.

31. The method as defined by claim 30 wherein at least two of the plurality of outgoing signals are transmitted in different directions.

32. An apparatus for processing data received from a remote network device, the apparatus comprising:
an input module for receiving, at different points in time, a plurality of copies of a single optical signal, the copies created by the remote device, a first copy being transmitted by a first directional transmitter and a second copy being transmitted by a second directional transmitter, the first and second transmitters having non-identical transmission directions, the optical signal being a wireless optical form of a first data signal;
an optical converter operatively coupled with the input module, the optical converter converting the plurality of copies of the optical signal into a plurality of second data signals, each second data signal having data from one of the copies of the optical signal;
memory for storing the plurality of second data signals; and a signal reconstruction module operatively coupled with the memory, the signal reconstruction module reconstructing the first data signal from the plurality of second data signals in memory.

33. The apparatus as defined by claim 32 wherein one of the plurality of copies of the optical signal is designated as a primary optical signal, the second data signal in memory that represents the primary optical signal being a primary second data signal, the apparatus further comprising:
a signal retrieving module for retrieving the primary second data signal, if the primary second data signal is incomplete, then the signal retrieving module retrieves additional data of the first data signal from at least one of the other second data signals in memory.

34. The apparatus as defined by claim 32 wherein the optical signal is an infrared signal.

35. The apparatus as defined by claim 32 wherein the plurality of copies of the optical signal are received through the air.

36. The apparatus as defined by claim 32 wherein the first data signal includes at least one of audio data and video data.

37. The apparatus as defined by claim 32 further comprising:
a signal generator for generating a first outgoing signal, the first outgoing signal being a data signal;
a synchronization module for synchronizing the first outgoing signal with a timing signal to produce a composite signal;
a signal converter for converting the composite signal into a second outgoing signal that is an optical signal; and
an output for transmitting a plurality of copies of the second outgoing signal to the remote device.

38. The apparatus as defined by claim 37 wherein at least two of the plurality of outgoing signals are transmitted in different directions.

39. A computer program product for use on a computer system for processing data received from a remote device, the computer program product comprising a computer usable medium having computer readable program code thereon, the computer readable program code comprising:
program code for receiving, at different points in time, a plurality of copies of a single optical signal, the copies created by the remote device, a first copy being transmitted by a first directional transmitter and a second copy being transmitted by a second directional transmitter, the first and second transmitters having non-identical transmission directions, the optical signal being a wireless optical form of a first data signal;
program code for converting the plurality of copies of the optical signal into a plurality of second data signals, each second data signal having data from one of the copies of the optical signal;
program code for storing the plurality of second data signals in memory; and
program code for reconstructing the first data signal from the plurality of second data signals in memory.

40. The computer program product as defined by claim 39 where in the program code for reconstructing comprises:
program code for designating one of the plurality of copies of the optical signal as a primary optical signal, the second data signal in memory that represents the primary optical signal being a primary second data signal;
program code for retrieving primary second data signal; and program code for retrieving additional data of the first data signal from at least one of the other second data signals in memory if the primary second data signal is incomplete.

41. The computer program product as defined by claim 39 wherein the optical signal is an infrared signal.

42. The computer program product as defined by claim 39 wherein the plurality of copies of the optical signal are received through the air.

43. The computer program product as defined by claim 39 wherein the first data signal includes at least one of audio data and video data.

44. The computer program product as defined by claim 39 further comprising:
program code for generating a first outgoing signal, the first outgoing signal being a data signal;
program code for synchronizing the first outgoing signal with a timing signal to produce a composite signal;
program code for converting the composite signal into a second outgoing signal that is an optical signal;
program code for transmitting a plurality of copies of the second outgoing signal to the remote device.

45. The computer program product as defined by claim 44 wherein at least two of the plurality of outgoing signals are transmitted in different directions.

46. The computer program product as defined by claim 39 wherein at least two of the plurality of copies of the optical signal are received from different directions.

47. A system for transmitting data signals to a receiver device, the system comprising:
 a first network device having a first transponder with a first cone of focus;
 a second network device having a second transponder with a second cone of focus, the first and second transponders each utilizing wireless optical signals to communicate,
 the first transponder being configured to transmit a first copy of an optical signal in a first direction; and
 the second transponder being configured to transmit a second copy of the same optical signal in a second direction, wherein the first and second directions are non-identical, and wherein the first copy of the optical signal is received by the receiver device at a different time than the second copy of the optical signal is received by the receiver device.

48. The system as defined by claim 47 wherein the second transponder is configured to receive at least one of the plurality of copies of a single optical signal.

49. The system as defined by claim 48 wherein the single optical signal is the optical version of a composite signal, the composite signal being a data signal having outgoing data to be transmitted by the first network device, the outgoing data being synchronized with a clock signal.

50. The system as defined by claim 49 wherein the second network device includes a processor for reconstructing the composite signal from the at least one of the plurality of copies of the single optical signal.

* * * * *